March 26, 1929.    A. H. SMITH    1,706,941
MACHINE FOR REENFORCING FILMS
Filed Sept. 8, 1926    4 Sheets-Sheet 3
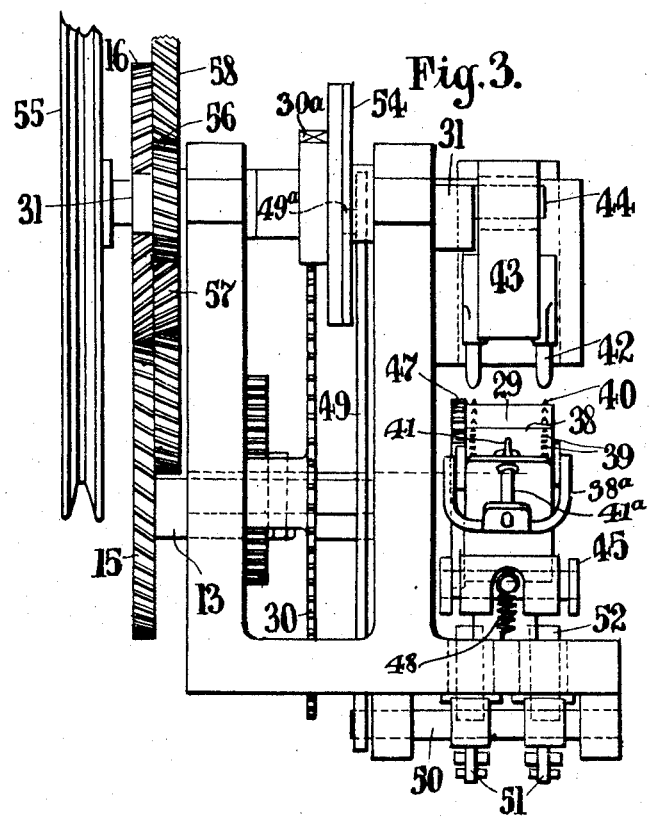
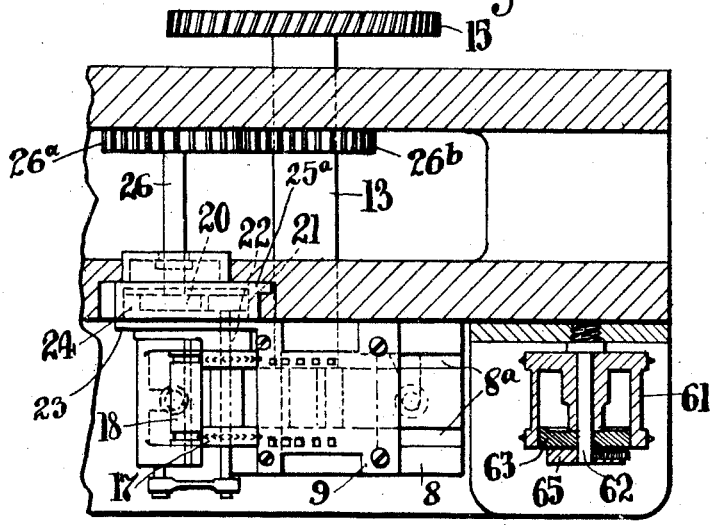

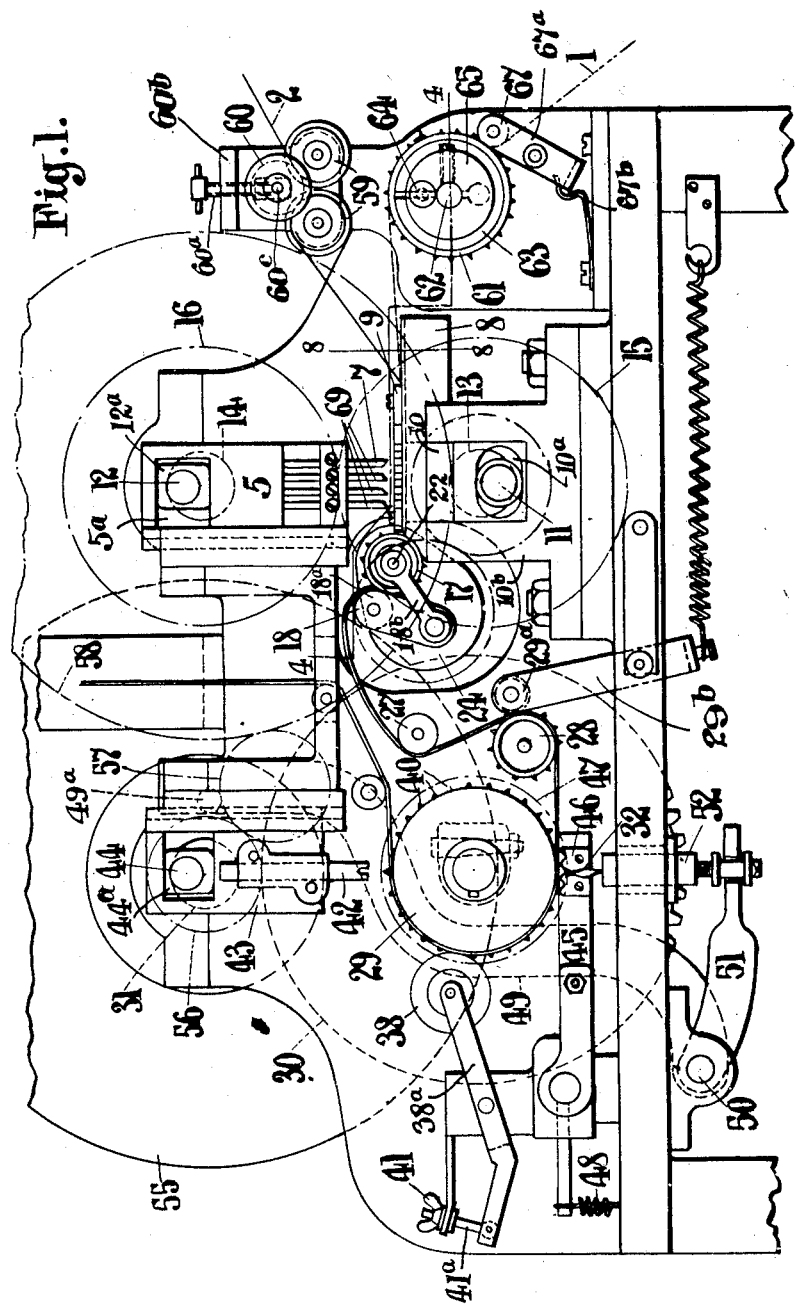

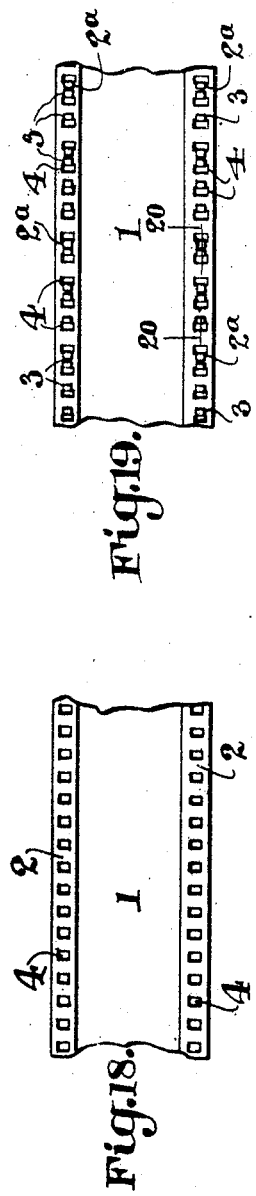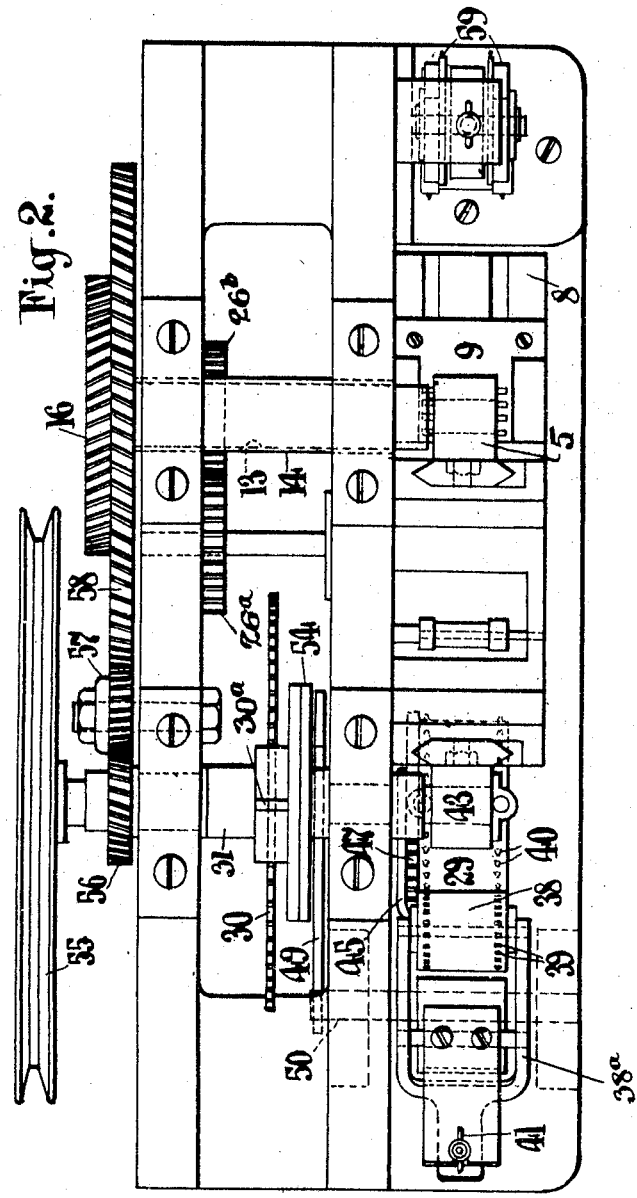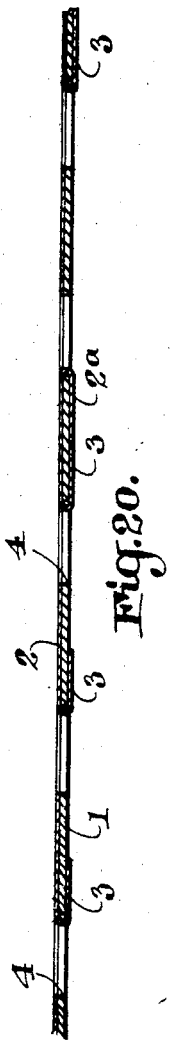

March 26, 1929.  A. H. SMITH  1,706,941
MACHINE FOR REENFORCING FILMS
Filed Sept. 8, 1926  4 Sheets-Sheet 4
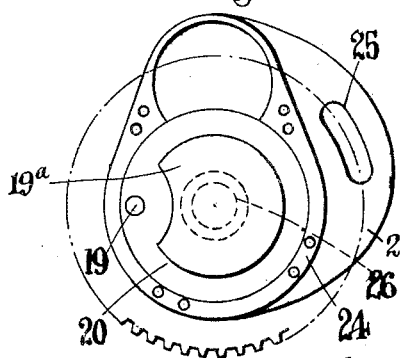
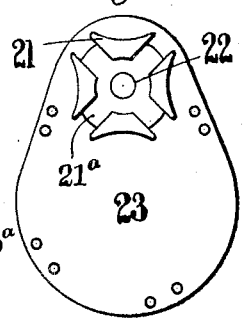
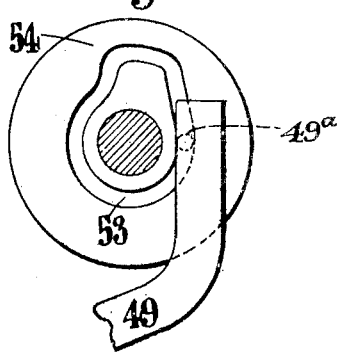
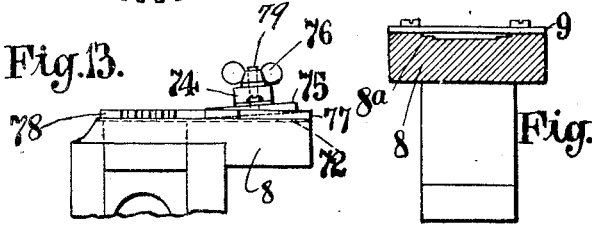
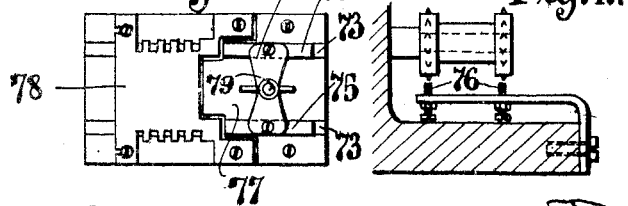
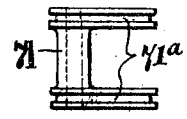
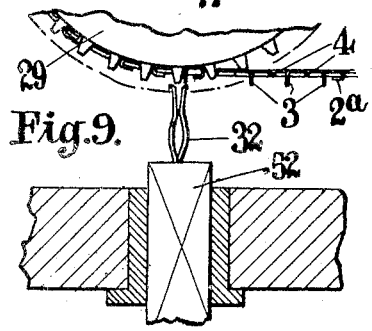
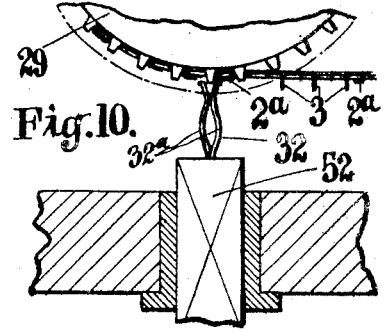
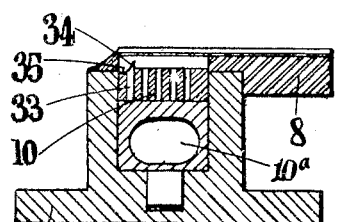
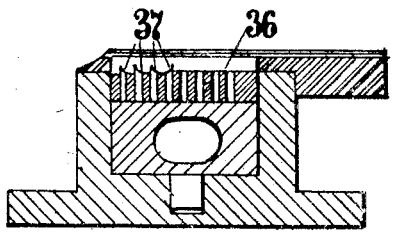

Patented Mar. 26, 1929.

1,706,941

UNITED STATES PATENT OFFICE.

ALBERT HENRY SMITH, OF BIRMINGHAM, ENGLAND.

MACHINE FOR REENFORCING FILMS.

Application filed September 8, 1926, Serial No. 134,212, and in Great Britain June 29, 1926.

This invention comprises a machine for fixing a ribbon or strip of metal or like material on the edge of a cinematograph film or the like.

According to the present improvements, the machine comprises means for perforating and piercing single tongues of metal of a size corresponding to the perforations in the film at intervals from a metal strip, means for drawing a cinematograph film or the like and the metal strip through the machine and means for bending the said tongues around the edges of the previously formed perforations in the film. The piercing tools are arranged to pierce the tongues from the metal strip so that some tongues may be bent around the front edges of the perforations in the film whilst some pass round the rear edges of the perforations in the film. The piercing tools are adapted to co-operate with a reciprocating die so that the tongues are free from the die when being fed forward. The reciprocating die may have bending tools thereon for folding the tongues around the edges of the perforations. Again the tongues may be bent or folded back by means of a reciprocating tool passing between the face of a tooth on a feed or toothed roller and a tongue to be bent. The tongues are conveniently clamped in a fixing position by means of a reciprocating tool whilst the strengthened film is located on the toothed cylindrical surface.

Referring to the drawings:—

Figure 1 is a front elevation of a machine constructed according to this invention.

Figure 2 is a plan.

Figure 3 is an end view.

Figure 4 is a sectional plan view of a portion of the machine, the section being taken on line 4—4 of Figure 1.

Figures 5 and 6 are details of mechanism hereinafter referred to for driving the feed rollers.

Figure 7 is a face view of the cam and of a portion of the lever for operating the bending tool.

Figure 8 is a section on line 8—8 of Figure 1.

Figure 9 is a detail illustrating the operation of the bending tool, such tool being at the bottom of its stroke.

Figure 10 is a similar view to Figure 9, but shows the tool at the top of its stroke.

Figure 11 is a longitudinal sectional view of the reciprocating die.

Figure 12 is a modified form of the die shown by Figure 11.

Figure 13 is a modified form of guide directing the film and metal strips under the piercing tools.

Figure 14 is a plan view of the parts shown by Figure 13.

Figure 15 is a face view of a modified device for retaining the film in engagement with the toothed cylinder at the delivery end of the piercing tools.

Figure 16 is a plan view of Figure 15.

Figure 17 illustrates modified or additional means for giving an additional bend to the tongues.

Figure 18 is a face view of the outside face of a reenforced film.

Figure 19 is a view of the opposite face to that shown by Figure 18, and

Figure 20 is an enlarged section on line 20—20 of Figure 19.

Referring to the drawings the film 1 is reenforced by the strengthening strips 2 which are, as set forth in my application for patent filed June 18th, 1926, and numbered 116,923, fixed to the edges of a cinematograph film by piercing tongues of metal $2^a$ and 3 therefrom and passing such tongues through the perforations 4 in the film and bending such tongues around the edges of the perforations. Conveniently four tongues are simultaneously pierced, and therefore four piercing tools are mounted in the sliding head 5, the three piercing tools 6 being adapted to pierce the tongues 3 so that they will be bent around the rear edge of the perforation, whilst the piercing tool 7 forms the tongue $2^a$ so that it will be bent around the front edge of the perforation in the film. Two sets of piercing tools are provided on the sliding head 5 for dealing with each metal strip. The tongues of metal are pierced and passed through the perforations in the film by the piercing tools, and for this purpose the film 1 is fed through the groove $8^a$ with the metal strips 2 super-imposed on the top surface on each side. The groove $8^a$ is formed in the stationary bed 8 and is covered by the plate 9 forming part of the stationary bed. The die 10 is reciprocated in unison with the punches so that the die moves out of engagement with the tongues to allow the film and strips to be fed forward, the film and metal strips are held against the plate 9 of the stationary bed during the piercing operation. In the form shown the die 10 and sliding head 5 are driven by means of crank pins 11 and 12 on the shafts 13 and 14 geared together by the toothed wheels 15 and 16. The crank pin 12 is rotatable in the block 12$^a$ slidably mounted in the slot 5$^a$ of the sliding head 5, which sliding head is mounted in the stationary frame. The crank pin 11 is mounted in the slot 10$^a$ in the die 10 which is slidably mounted in the bracket 10$^b$ carried by the stationary frame. The film 1 with the metal strips 2 thereon passes under the toothed cylinder 17, the roller 18 pressing the film and metal strips on the toothed roller 17 and keeping the film in engagement therewith. This roller has sixteen teeth thereon, so that it is required to be driven a quarter of a revolution for each reciprocation of the piercing tools. For this purpose the pin 19 on the collar 20 (Figure 5) for each rotation, successively engages the grooves 21$^a$ in the member 21 which is mounted on the spindle 22 carrying the feed roller 17, and the shaped boss 19$^a$ locks the member 21 in position between each quarter turn. The member 22 is carried by the cover plate 23 which is mounted on the casing 24. This casing 24 forms a bearing for the shaft 26 and is rotatably mounted in the stationary frame (see Figure 4) and can be turned back to lift the feed roller 17 for the purpose of inserting the film at the commencement of the operation. A screw pin passes through the slot 25 in the flange 25$^a$ of the casing and enters a tapped hole in the stationary frame to hold the casing 24 in position. The roller 18 is mounted in the fitting 18$^a$ carried by the cover plate 23, and an arm 18$^b$ fixed to the fitting 18$^a$ supports the outer end of the spindle 22. The collar 20 is mounted on the shaft 26 which is geared through the medium of the gear wheels 26$^a$ and 26$^b$ to the spindle 13 reciprocating the die 10. The strengthened film passes over the guide roller 27 and a toothed guide roller 28, the spring pressure roller 29$^a$ carried by the pivoted lever 29$^b$ holding the film in engagement with the toothed roller 28. After leaving the roller 28 the strengthened film passes round a toothed roller 29 which is driven, at four intervals four teeth forward for each reciprocation of the piercing tools. Between the toothed rollers 17 and 28 therefore a slackness of the film is provided for due to the fact that the film passes over the roller 17 four teeth simultaneously, while it passes over the roller 28 one tooth at a time. The toothed roller 29 is conveniently driven forward one tooth at a time by means of a key or projection 30$^a$ on a boss of the shaft 31, engaging and moving forward the wheel 30 one tooth for each revolution of the shaft 31, the wheel 30 being mounted on the shaft carrying the roller 29.

The tongues 3 are folded around the edges of the perforations in the film in one construction by means of reciprocating tools 32 comprising a pair of spring arms 32$^a$ which respectively move up between one face of a tooth on the roller 29 and the tongue to be bent to thereby press such tongue back as shown by Figure 10. It is preferred however to bend back the tongues 2$^a$ formed by the pair of tools 7 such as by means of a pair of bending tools 33 (Figure 11) which are fitted to the die 10. These bending tools 33 move up against the last formed pair of tongues 2$^a$ and cause the end of each tongue to slide down the curved surface 34 so that the lower portion 35 completes the bending. The tools 33 also form pilots for positioning the film and metal strips before each piercing operation. If desired all the tongues may be bent back in this fashion by means of the die 36 which carries four bending tools 37.

A pressure roller 38 mounted on the end of the lever 38$^a$ and having recesses 39 for receiving the teeth 40 on the roller 29 bears on the film and rolls the tongues down, the pressure of this roller 38 being adjusted by means of the wing nut 41 which engages the bolt 41$^a$ carried by the lever 38$^a$. A pair of clamping tools 42 are mounted in the sliding head 43 which is reciprocated by means of the crank pin 44 carried by the spindle 31, the crank pin being mounted in the block 44$^a$ which is mounted in a slot in the head 43. Each clamping tool is double sided so that it will strike on each side of the teeth 40 and thus give a clamping blow to either the tongues 3 or 2$^a$. The toothed roller 29 is locked in the correct position after each feed motion by means of the rocking arm 45 having a toothed plate or end 46 which engages the teeth of a wheel 47 mounted rigidly with the roller 29. This arm 45 is held in engagement with the toothed wheel by means of the spring 48. When the roller 29 is driven the teeth of the wheel 47 move back the arm 45 which then springs back into engagement with the teeth of the wheel 47 so that the toothed roller 29 can only move forward the pre-determined extent equivalent to one tooth. The bending tools 32 are reciprocated by means of the lever 49 which is mounted on the spindle 50, such spindle carrying arms 51 which engage the lower end of the slide 52 carrying the bending tools 32. As shown by Figure 7 the upper end of the arm 49 carries a pin 49$^c$ which engages a cam groove 53 in the member 54 mounted on the spindle 31.

The spindle 31 is driven in any convenient manner such as by means of a pulley 55, the drive being transmitted to the shaft 14 by means of the train of wheels 56, 57 and 58.

The film 1 and strips 2 are fed into the machine from suitably mounted spools and are fed under the piercing tools at a suitable tension. For this purpose the strips 2 are passed between the tension rollers 59 and 60, the roller 60 being, to obtain the required pressure on the strips, adjustably mounted by means of the screw pin 60ᵃ which screw engages the top of the bracket 60ᵇ and is connected to the spindle 60ᶜ carrying the roller 60. The film 1 is also fed forward over a suitable tensioning device, which in the construction illustrated, comprises a toothed roller 61 mounted on the stationary spindle 62. The split disc 63 is fixed in relation to the spindle 62 and is adapted to be expanded to give the required frictional grip on the internal surface of the roller 61. To expand the disc 63, the pin 64 is mounted in a tapped hole in the fixed disc 65 and has a conical portion for engaging similar shaped recesses in the split edges of the disc 63. The guide and pressure roller 67 maintains perforations in the film in engagement with the teeth of the roller 61. The pressure roller 67 is mounted on the lever 67ᵃ which is under control of the spring 67ᵇ. It will thus be seen that the film is fed forward by means of toothed cylinders engaging the perforations in the film and also by toothed cylinders engaging the registering perforations of the film and metal strips. As these toothed cylinders are similar to the toothed cylinders of projecting apparatus it therefore follows that the metal strips are correctly applied to the film and the strengthened film will thus pass through any projecting apparatus normally adapted to take an unstrengthened film at present in use.

In lieu of the cylinder 18 the guide block 71 (Figures 15 and 16) may retain the film and strengthening strips in engagement with the toothed cylinder 17, the guide block having grooves 71ᵃ.

According to the modified form shown by Figures 13 and 14 the film is passed under the piercing tools through the guide slots 72, while the metal strips are passed through the inclined slots 73 to meet the film, the pressure blocks 75 bearing on the strips passing through these slots. The bridge spring 74 bears on and is fixed by screws to the blocks 75, the pressure being adjusted by the thumb screw 76. The guide slots 72 are formed in the stationary bed 8 and are covered by the plates 77 and 78. The guide slots 73 are formed in the top of the plate 77. The thumb screw 76 screws on the pin 79 carried by the plate 77. By adjusting the tension of metal strip through the medium of the screw 76, and by adjusting the tension on the film through the medium of the screw 64, the film and metal strips lie flat on one another after the piercing operation.

If desired the tongues 3 before passing to the roller 29 may be initially bent by inserting the screw pins 76 (Figure 17) in the path of such tongues, the height of the pins being adjustable.

Claims.

1. A machine for fixing a ribbon or strip of metal on the previously perforated edges of a cinematograph film comprising a plurality of piercing tools for perforating and piercing single tongues, from the metal strip of a size corresponding to the perforations in the film and so that some tongues are located on one side and some on the other side of the respective perforations, toothed cylinders for drawing the film and metal strip through the machine, and means for bending the said tongues around the edges of the perforations in the film in such a manner that some tongues are bent around the front edges and some around the rear edges.

2. A machine for fixing a ribbon or strip of metal on the previously perforated edges of a cinematograph film comprising means for perforating and piercing single tongues from the metal strip of a size corresponding to the size of the perforations in the film, which means comprise a plurality of reciprocating piercing tools and reciprocating dies co-acting therewith which are simultaneously operated, some of which piercing tools are oppositely arranged to the remainder so that the tongues are bent in different directions, toothed cylinders for intermittently drawing the film and metal strip from under the punches corresponding to the length perforated, and means for bending the said tongues around the edges of the perforations in the film.

3. A machine for fixing a ribbon or strip of metal on the previously perforated edges of a cinematograph film comprising means for perforating and piercing single tongues of a size equal to that of the perforation from the metal strip comprising a plurality of reciprocating piercing tools and a reciprocating die co-acting therewith which are simultaneously operated and which piercing tools are oppositely arranged so that the tongues are bent in different directions, toothed cylinders for drawing the film and metal strip through the machine, and means for bending tongues around the edges of the perforations in the film comprising tools carried by the said reciprocating die.

4. A machine for fixing a ribbon or strip of metal on the previously perforated edges of a cinematograph film comprising means for perforating and piercing single tongues from the metal strip of a size equal to that of the perforation, toothed cylinders for drawing the film and metal strip through the machine, means for bending tongues around the edges of the perforations in the film comprising tools carried by the said reciprocating die, and means for bending tongues around the edges of the perforations in the film, comprising a reciprocating tool which is adapted to pass over the side of a tooth of a toothed cylinder over which the film and strip passes with the tongues projecting through the perforations in the film.

5. A machine for fixing a ribbon or strip of metal on the previously perforated edges of a cinematograph film comprising means for perforating and piercing single tongues from the metal strip of a size equal to that of the perforation, toothed cylinders for drawing the film and metal strip through the machine and means for bending the said tongues around the edges of the perforations in the film, a toothed roller over which the film and metal strips pass with tongues bent round edges in the perforations, and a reciprocating bifurcated tool for giving a clamping blow on the bent tongues, whilst the film and metal strips are engaged on the teeth of the toothed roller.

6. A machine for fixing a reenforcing ribbon or strip of metal on the previously perforated edges of a cinematograph film comprising a plurality of reciprocating piercing tools and a reciprocating die co-operating therewith which are simultaneously operated, a stationary bed against which the film and metal strip are held by the die for the piercing operation and which supports the film and metal strip in position during their passage between the piercing tools and the reciprocating die, a driven toothed cylinder located at the delivery end of the stationary bed, a guide for holding the film and metal strips around the periphery of said toothed cylinder, and a tensioning device for placing the required tension on the metal strips and film at the feed end of the machine.

7. A machine for fixing a reenforcing ribbon or strip of metal on the previously perforated edges of a cinematograph film comprising a plurality of reciprocating piercing tools and a reciprocating die co-acting therewith which are simultaneously operated, a stationary bed against which the film and metal strip are held by the die for the piercing operation and which supports the film and metal strip in position during their passage between the piercing tools and the reciprocating die, a driven toothed cylinder located at the delivery end of the stationary bed, a guide for holding the film and metal strips around the periphery of said toothed cylinder, an adjustable tensioning device at the feed end for the metal strip comprising three rollers one of which is adjustable in relation to the other two, and an adjustable tensioning device for the film at the feed end of the machine.

8. A machine for fixing a reenforcing ribbon or strip of metal on the previously perforated edges of a cinematograph film comprising a plurality of reciprocating piercing tools and a reciprocating die co-acting therewith which are simultaneously operated, a stationary bed against which the film and metal strip are held by the die for the piercing operation and which supports the film and metal strip in position during their passage between the piercing tools and the reciprocating die, a driven toothed cylinder located at the delivery curved end of the stationary bed, a guide for holding the film and metal strips around the periphery of said toothed cylinder, an adjustable tension device at the feed end of the metal strip, and an adjustable tension device at the feed end of the film comprising a toothed roller over which the film runs and a friction device for retarding the free rotation of the toothed roller.

9. A machine for fixing a ribbon or strip of metal on the previously perforated edges of a cinematograph film comprising a plurality of reciprocating piercing tools and a reciprocating die co-acting therewith which are simultaneously operated, a stationary bed against which the film and metal strip are held by the die for the piercing operation and which supports the film and metal strip in position during their passage between the piercing tools and the reciprocating die, a driven toothed cylinder located at the delivery end of the stationary bed, a guide for holding the film and metal strips around the periphery of said toothed cylinder, an adjustable tensioning device for placing the required tension on the film at the feed end of the machine, a recessed guide in the stationary bed for receiving the film, superimposed inclined recessed guides for receiving the metal strips, and bars adjustably spring pressed on the strips in the latter recessed guides.

10. A machine for fixing a reenforcing ribbon or strip of metal on the perforated edges of a cinematograph film comprising a driven shaft, means for piercing tongues from the reenforcing ribbon through the perforations in the film comprising a number of reciprocating piercing tools and a reciprocating die co-acting therewith, shafts driving said reciprocating tools which are geared together and also to the said driven shaft, a toothed roller intermittently pulling from under the piercing tools a length of film and reenforcing ribbon containing the plurality of tongues formed by the reciprocating tools, which toothed roller is driven from one of said shafts driving the reciprocating piercing tools or die, a toothed roller around which the film is passed with the teeth engaging each set of registering holes in the film and metal strip and which toothed roller is intermittently driven one tooth at a time, a reciprocating bending tool pressing back tongues while the film is on the roller, a pivoted lever operating the bending tool and operated by the driven shaft first mentioned, and means for driving the last mentioned roller from said first mentioned driving shaft.

11. A machine for fixing a ribbon or strip of metal on the perforated edges of a cinematograph film comprising means for perforating and piercing single tongues of a size equal to that of the perforation from the metal strip comprising a plurality of reciprocating piercing tools and a reciprocating die co-acting therewith which are simultaneously operated and which piercing tools are oppositely arranged so that the tongues are bent in different directions, toothed cylinders for drawing the film and metal strip through the machine, means for bending some tongues around the edges of the perforations in the film comprising tools carried by the said reciprocating die, and means for initially bending the remaining tongues comprising pins or projections located in the path of the tongues.

In testimony whereof I have signed my name to this specification at Birmingham, this 23rd day of August, 1926.

ALBERT HENRY SMITH.